Aug. 23, 1966  R. V. TALLEY  3,267,775
ADJUSTABLE TORQUE TOOL HAVING PREDETERMINED
OVERLOAD YIELDING MEANS
Filed Dec. 17, 1962
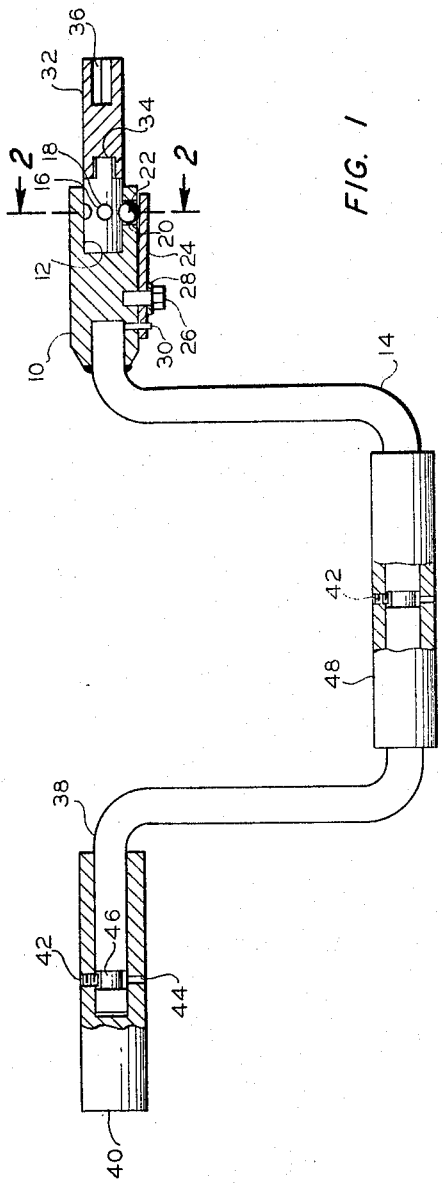
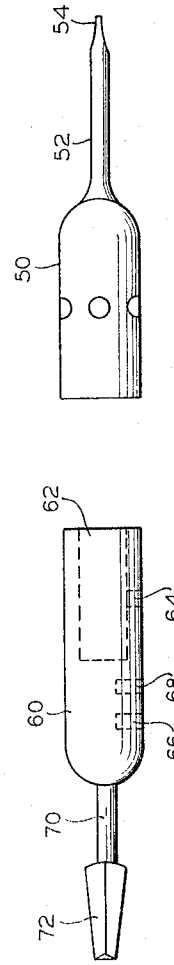
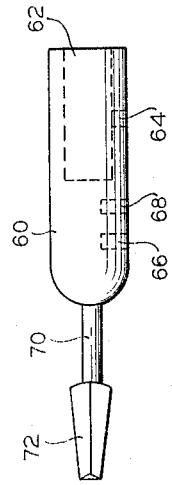
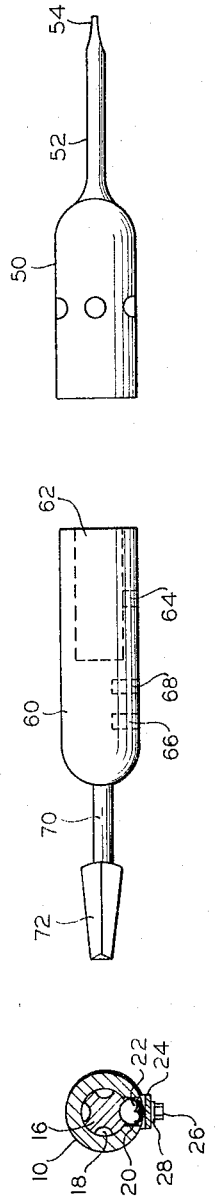
INVENTOR.
R. V. TALLEY 3,267,775
ADJUSTABLE TORQUE TOOL HAVING PREDETERMINED OVERLOAD YIELDING MEANS
Ralph V. Talley, Bartlesville, Okla., assignor of fifty percent to Vashti Y. Holt, Tulsa, Okla.
Filed Dec. 17, 1962, Ser. No. 245,146
1 Claim. (Cl. 81—52.4)

This invention relates to an adjustable torque head or tool for applying a selected torque to a nut, bolt, screw or other device to be turned, such as the winding element of a clock, meter, chart drive or other spring actuated instrument.

In the winding of drive springs it is important that the tension of wind on the spring be controlled or limited to a tension point not to exceed the safe limits of the intrinsic design or material construction of the mechanism. Yet it is advantageous to make use to the utmost the inherent power of said drive spring within the limits of safety of such spring and said mechanism.

In the petroleum and chemical process industries, as well as in other fields, it is important from the standpoint of useful life and maintenance cost through the damage of over-winding, that a chart drive (such as is used in a recording instrument) be wound properly so as to obtain the best performance and the longest life possible. Uniformity of winding and correct tension of fully wound mainspring in the past have been a matter of guess work, depending principally on leverage of the winding device, crank or other tool and the strength of the user.

In the application of power wrenches, screwdrivers, and other torque tools, the application of the proper torque is essential to avoid stripping the threads of either the male or female element of the device being coupled. Proper regulation of the torque tool to apply a selected predetermined torque is necessary.

Accordingly, it is an object of this invention to provide a torque tool which is adjustable for a selected torque and simple to adjust and operate. Another object is to provide an adjustable torque head which applies a uniform pre-selected torque to a nut, bolt, screw, or winding device such as a spring wound instrument. It is also an object of the invention to provide the art with an adjustable torque head which is simple in design and construction, easy to manufacture, and low in cost. Other objects will become apparent to one skilled in the art upon consideration of the accompanying disclosure.

A broad aspect of the invention comprises a torque head including a socket having means at one end for attachment to a handle or turning device and an axial cylindrical recess at the opposite end, a shaft having gripping means on one end and a cylindrical section on the other end extending into and engaging the walls of said recess, there being a circumferential ball seat in said cylindrical section for seating a ball member, an opening through the wall of said socket diametrically aligned with said seats, a ball member in said opening, and a spring biased against said ball to hold same in said seat with a force determined by an adjustable tension on said spring. When the head is rotated about its axis and that of the shaft while said shaft grips a nut or other device to be turned, the ball seated in the seat in the shaft with pressure applied by the spring locks the shaft to the surrounding socket. When the torque applied to the nut reaches a selected maximum, the ball slips from its seat and allows the shaft to turn in the recess in the socket. The maximum torque is determined by the tension of the spring and by the size and depth of the ball in the shaft.

A more complete understanding of the invention may be had by reference to the accompanying schematic drawing of which FIGURE 1 is a side view in partial section of a torque wrench constructed in accordance with the invention; FIGURE 2 is a sectional view taken on the line 2—2 of FIGURE 1; and FIGURES 3 and 4 are side views of other embodiments of the gripping shaft of FIGURE 1.

Referring to FIGURES 1 and 2, a torque head comprises a socket 10 provided with a cylindrical recess 12 drilled axially therein and a similar recess in the opposite end for receiving a handle or crank 14. A ratchet or detent shaft 16 of slightly less diameter than recess 12 fits into the recess and is provided with one or more ball seats or detents 18 in rotational alignment thereon. An opening or passageway 20 through the wall of socket 10 opposite seats 18 provides a housing for a ball member 22 which fits into seats 18 and extends, preferably, exteriorly of the socket 10.

A spring 24 extends longitudinally of socket 10 and overlaps ball member 22 at one end and is fixed to socket 10 at the opposite end section by cap screw 26. Cap screw 26 is provided with lock washer 28 and is threaded into socket 10. A spring locking pin 30 extends through spring 24 into socket 10 to hold the spring in proper alignment with ball 22. Since ball 22 holds spring 24 off socket 10 at the adjacent end and adjusting screw 26 is positioned intermediate the ends of spring 24, adjustment of screw 26 varies the tension applied by the spring to ball 22 and therefore the maximum torque applied by the torque head before slippage of shaft 16 in socket 10 occurs by forcing ball 22 out of its seat against the tension of the spring. By proper design of spring 24 placement of adjusting screw 26 with respect to the fixed and free end of spring 24 and the size and placement of ball 22 within shaft 16, a suitable adjustable torque can be provided for a range of applications and torques.

A ratchet or detent shaft extension 32 is attached by a flexible joint 34 coaxially to shaft 16 and is provided with a receptacle 36, such as a hexagonal cavity for gripping a nut, bolt, or the like. Shaft 16 and extension 32 may be unitary, if desired.

Crank 14 is attached to socket 10 by soldering, welding, or other suitable means. Outer handle section 38 is provided with a rotatable handle 40 attached by means of a set screw 42 and provided with an oil hole 44 both of which communicate with a groove 46 in handle section 38. A center handle 48 is similar to handle 40 and provided with a corresponding set screw and oil hole.

FIGURE 3 illustrates a screwdriver bit comprising a shaft 50 and a blade 52 provided with a point 54, which may be either a standard blade to fit a screw slot or a Phillips type head or tip. Shaft 50 is provided with seats 56 which have the function of seats 18 of shaft 16 (FIGURE 1).

FIGURE 4 illustrates a socket 60 corresponding to socket 10 of FIGURE 1. Recess 62 and passageway 64 have the functions of the corresponding elements of FIGURE 1 as do holes 66, and 68 for pin 30 and set screw 26, respectively. Shank 70 is provided with a head 72 designed to cooperate with the jaws of tool such as a carpenter's brace. Head 72 may be omitted so that the device may be used in an ordinary drill chuck.

In application of the invention to clocks or other spring wound instruments, receptacle 26 in shaft 16 or extension 32 may be threaded to engage a threaded winding member on the instrument or it may be of square cross section similar to a clock key.

The torque applied by the tool in any specific application may be set by use of an indicating torque tester or by comparison with the efficiency of a simple winding device such as a clock key, a wrench of proper leverage to not strip the threads of the fastening device, or wind the spring too tight. Of course, the torque tester is the more satisfactory method, but trial and error can be used successfully.

A torque wrench made in accordance with FIGURES 1 and 2 of the drawing was constructed and tested in the field over a substantial period of time. This tool was threaded on the end to fit the winding pin on drive springs of clocks, meters, and charts. Use of the tool on these instruments lengthened spring life and the life of the instruments themselves several fold compared with spring life when the same instruments were wound with a key.

It is to be understood that the illustrative details set forth herein are not to be construed as unnecessarily limiting the invention. Variations in the configuration and design of the elements of the tool may be made within the scope of the invention.

I claim:

A torque head for winding and applying a torque of selected value to chart drives or parking meter timing springs comprising:

- a cylindrical socket having means at one end for attachment to a handle and an axial cylindrical recess in the other end;
- a shaft of substantially the diameter of said recess rotatably positioned within said recess and having a portion thereof extending beyond the end of said socket;
- a plurality of seats circumferentially aligned in the wall of said shaft within said recess, said seats adapted to seat a single ball member;
- an opening through the wall of said socket in alignment with said seats to accommodate said ball member;
- said ball member having a diameter substantially greater than the thickness of said socket wall whereby a portion of said ball member extends beyond said socket wall when said ball member is seated in one of said seats;
- a flat spring adjustably attached longitudinally to said socket by means of a set screw adjacent one end of said spring and near said handle attachment, the other end being biased aganist said portion of said ball member extending exteriorly of said socket wall;
- a spring locking pin adjacent one end of said spring and extending through said spring into said socket to hold the spring in proper alignment with said ball member; and
- a polygonal recess on the outer end of said shaft for accommodating the male element of said timing spring rewind element.

References Cited by the Examiner

UNITED STATES PATENTS

| | | | |
|---|---|---|---|
| 774,931 | 11/1904 | Bucknam | 81—52.6 X |
| 1,140,271 | 5/1915 | Le Cato | 267—1 |
| 1,525,545 | 2/1925 | James | 81—52.4 |
| 1,547,093 | 7/1925 | Burch | 81—73 X |
| 1,565,754 | 12/1925 | Orth | 81—52.6 X |
| 1,966,720 | 7/1934 | Henning | 267—1 |
| 2,585,146 | 2/1952 | Maiorany | 267—1 |
| 2,773,370 | 12/1956 | Intraub et al. | 81—52.4 |
| 2,817,988 | 12/1957 | Stahl | 81—73 |
| 2,826,107 | 3/1958 | Woods | 81—52.4 |
| 2,831,383 | 4/1958 | Riess | 81—52.4 |
| 2,884,103 | 4/1959 | Connell | 81—52.4 |

WILLIAM FELDMAN, *Primary Examiner.*

M. S. MEHR, *Assistant Examiner.*